(12) United States Patent
Allen et al.

(10) Patent No.: US 9,444,696 B2
(45) Date of Patent: Sep. 13, 2016

(54) AUTONOMIC SLA BREACH VALUE ESTIMATION

(71) Applicant: SERVICENOW, INC., Santa Clara, CA (US)

(72) Inventors: Joshua S. Allen, Durham, NC (US); Bryan M. Ellington, Cary, NC (US); Bradford A. Fisher, Chapel Hill, NC (US); Robert L. Nielsen, Chapel Hill, NC (US); Jacob E. Yackenovich, Morrisville, NC (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 14/325,340

(22) Filed: Jul. 7, 2014

(65) Prior Publication Data

US 2014/0325071 A1   Oct. 30, 2014

Related U.S. Application Data

(63) Continuation of application No. 10/675,726, filed on Sep. 30, 2003, now Pat. No. 8,775,585.

(51) Int. Cl.
*G06F 15/173* (2006.01)
*H04L 12/24* (2006.01)
(Continued)

(52) U.S. Cl.
CPC ....... *H04L 41/5016* (2013.01); *H04L 12/2602* (2013.01); *H04L 29/06* (2013.01); *H04L 41/5003* (2013.01); *H04L 41/507* (2013.01);
(Continued)

(58) Field of Classification Search
CPC .............. H04L 12/2602; H04L 29/06; H04L 41/5003; H04L 43/045
See application file for complete search history.

(56) References Cited

U.S. PATENT DOCUMENTS 5,889,600 A    3/1999   McGuire
5,903,370 A    5/1999   Johnson
(Continued)

FOREIGN PATENT DOCUMENTS

EP    1111840 A2    6/2001
WO    0244832 A2    6/2002

OTHER PUBLICATIONS

U.S. Appl. No. 10/675,726, Non-Final Office Action, Mar. 19, 2008, 9 pg.
(Continued)

*Primary Examiner* — Scott B Christensen
*Assistant Examiner* — Thomas Richardson
(74) *Attorney, Agent, or Firm* — Young Basile Hanlon & MacFarlane, P.C.

(57) ABSTRACT

A method, system and apparatus for estimating an SLA breach value. The method can include processing resource data to identify an acceptable SLA breach value; and, displaying the acceptable SLA breach value through a user interface. The processing step can include identifying a best practices SLA breach value based upon resource data for an aggregation of customers. Alternatively, the processing step can include identifying an average SLA breach value for a specific customer. As a further alternative, the identifying step can include identifying an average SLA breach value for a specific customer for a specific resource. As yet a further alternative, the processing step can include identifying an SLA breach value trend based upon past measured historical systems management data; and, predicting a future SLA breach value based upon the trend. In all cases, the acceptable SLA breach value can be increased by a fixed proportion.

11 Claims, 2 Drawing Sheets

(51) Int. Cl.
*H04L 12/26* (2006.01)
*H04L 29/06* (2006.01)
*H04L 29/08* (2006.01)

(52) U.S. Cl.
CPC .......... *H04L 41/5009* (2013.01); *H04L 43/00* (2013.01); *H04L 12/2692* (2013.01); *H04L 43/045* (2013.01); *H04L 43/16* (2013.01); *H04L 69/329* (2013.01)

(56) References Cited

U.S. PATENT DOCUMENTS

| | | | |
|---|---|---|---|
| 5,905,715 | A | 5/1999 | Azarmi et al. |
| 7,269,652 | B2* | 9/2007 | Chen et al. ................... 709/226 |
| 7,437,449 | B1* | 10/2008 | Monga et al. ................ 709/224 |
| 8,775,585 | B2 | 7/2014 | Allen et al. |
| 2002/0038366 | A1* | 3/2002 | Harasawa .......... H04L 41/5003 709/224 |
| 2002/0116234 | A1 | 8/2002 | Nagasawa |
| 2002/0120697 | A1 | 8/2002 | Generous et al. |
| 2002/0143920 | A1 | 10/2002 | Dev et al. |
| 2004/0153563 | A1 | 8/2004 | Shay et al. |
| 2005/0005271 | A1* | 1/2005 | Clymer et al. .................... 718/1 |
| 2005/0038789 | A1 | 2/2005 | Chidambaran et al. |
| 2005/0065805 | A1 | 3/2005 | Moharram |
| 2005/0071450 | A1 | 3/2005 | Allen et al. |
| 2005/0097209 | A1* | 5/2005 | McDonagh et al. .......... 709/224 |
| 2005/0177629 | A1* | 8/2005 | Betge-Brezetz et al. ..... 709/223 |
| 2006/0026179 | A1 | 2/2006 | Brown et al. |

OTHER PUBLICATIONS

U.S. Appl. No. 10/675,726, Final Office Action, Sep. 12, 2008, 12 pg.
U.S. Appl. No. 10/675,726, Appeal Brief, Dec. 8, 2008, 22 pg.
U.S. Appl. No. 10/675,726, Examiner's Answer, Mar. 20, 2009, 13 pg.
U.S. Appl. 10/675,726, Decision on Appeal, Jul. 22, 2010, 14 pg.
U.S. Appl. No. 10/675,726, Non-Final Office Action, Nov. 10, 2010, 12 pg.
U.S. Appl. No. 10/675,726, Final Office Action, Apr. 11, 2011, 14 pg.
U.S. Appl. No. 10/675,726, Final Office Action, Aug. 16, 2011, 18 pg.
U.S. Appl. No. 10/675,726, Appeal Brief, Nov. 14, 2011, 56 pg.
U.S. Appl. No. 10/675,726, Examiners Answer, Mar. 5, 2012, 29 pg.
U.S. Appl. No. 10/675,726, Reply Brief, May 7, 2012, 17 pg.
U.S. Appl. No. 10/675,726, Decision on Appeal, Sep. 28, 2012, 22 pg.
U.S. Appl. No. 10/675,726, Request for Reconsideration,.

* cited by examiner

AUTONOMIC SLA BREACH VALUE ESTIMATION

CROSS-REFERENCE TO RELATED APPLICATIONS

This application is a Continuation of U.S. application Ser. No. 10/675,726, filed on Sep. 30, 2003.

BACKGROUND OF THE INVENTION

1. Statement of the Technical Field

The present invention relates to the field of policy based differentiation and more particularly to the real-time monitoring and enforcement of the terms of a service level agreement (SLA).

2. Description of the Related Art

The modern global network can be viewed as a complex interweaving of multiple network technologies, server platforms, client capabilities and application requirements. The vast majority of network technologies handle device requests indiscriminately. That is, regardless of the identity of the requester or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requesters receive different levels of treatment depending upon administratively defined policies. In this regard, a service level agreement (SLA) can specify a guaranteed level of responsiveness based upon a pre-defined policy. More particularly, the SLA is a contract that specifies an agreement between a service provider and customer regarding a level of service to be provided by the service provider to the customer in respect to a specific resource or resources.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different levels of security and quality of service (QoS) have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

Within the modern enterprise, the enterprise can receive a substantial benefit for effectively providing differentiated service to different customers and different data so that some customers and data receive a higher level of service than other customers and data on the network. That is to say, where the enterprise satisfies the expected service level of a valued customer, the enterprise can retain the customer. Conversely, where the enterprise fails to satisfy the expected level of service of a valued customer, the enterprise likely can lose the customer. Hence, differentiated service can be an important component of e-commerce inasmuch as a customer always can be viewed as merely "one click away" from a competitor's system where response times falter.

Accordingly, the enforcement of the terms of an SLA can be of paramount importance in managing the customer service relationship. To that end, service level management systems have become commonplace in the enterprise. A service level management system can track services provided to customers and compare the delivery of services to the service terms of a corresponding SLA. Data can be collected over time in respect to the resources associated with the SLA and the data can be evaluated to determine if any of the terms of the SLA have been breached.

Part of the process of defining an SLA involves choosing the thresholds across which a breach of the SLA can be identified. Presently, SLA breach values are manually selected when configuring service level objectives for a service offering. Still, SLA breach values are the most critical piece of information included in an SLA because trends and violations are calculated against the defined breach values. Ideally, when establishing a breach value, each of a resource performance measurement, measurement time period and a target set of resources must be specified. Thus, recommending a breach value for use during the configuration process can be complicated.

SUMMARY OF THE INVENTION

The present invention addresses the deficiencies of the art in respect to establishing an SLA breach value and provides a novel and non-obvious method, system and apparatus for SLA breach value estimation. In this regard, in a preferred aspect of the invention, an SLA breach value estimator can include a communicative coupling to performance history data for at least one resource for at least one customer; and, a further communicative coupling to a user interface through which an SLA breach value estimate is proposed. Finally, the SLA breach value estimator can include at least one SLA breach value estimation process selected from the group consisting of an aggregated process, a specific customer process, a customer resource subset process, and a predictive process.

Notably, in the preferred aspect of the invention, the SLA breach value estimator can be disposed within an SLA builder. Additionally, the SLA breach value estimator can include a graphical user interface configured to render a chart of performance data over time derived from the performance history data along with an indication of a current SLA breach value setting and a proposed SLA breach value setting. As such, the proposed SLA breach value setting can include a programmatic configuration for being graphically modified to establish a new SLA breach value setting.

Finally, in an alternative embodiment of the present invention, a compliance process can be disposed within the SLA breach value estimation process. The compliance process can include logic for proposing an SLA breach value estimate computed to render probable SLA compliance for a percentage of time equivalent to a specified compliance value. The compliance process further can include a compliance interface through which the compliance value can be specified.

A method for estimating an SLA breach value can include processing resource data to identify an acceptable SLA breach value; and, displaying the acceptable SLA breach value through a user interface. The processing step can include identifying a best practices SLA breach value based upon data for an aggregation of customers. Alternatively, the processing step can include identifying an average SLA breach value for a specific customer. As a further alternative, the identifying step can include identifying an average SLA breach value for a specific customer for a specific resource. As yet a further alternative, the processing step can include identifying an SLA breach value trend based upon past measured resource data; and, predicting a future SLA breach value based upon the trend. In all cases, the acceptable SLA breach value can be increased by a fixed proportion.

Importantly, a chart of the resource data can be rendered against a period of time in a graphical user interface. Additionally, an indicator both of a current SLA breach value and a proposed SLA breach value can be overlain about the rendered chart. Preferably, the graphical manipulation of the indicator of the proposed SLA breach value can be permitted. Consequently, an SLA breach value can be established based upon the graphical manipulation. Alternatively, a compliance percentage can be established. Subsequently, the acceptable SLA breach value can be established so that SLA compliance is probable for a percentage of time equivalent to the compliance percentage.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is an SLA breach value estimation system, method and apparatus. In accordance with the present invention, an SLA breach value can be proposed at the time of constructing an SLA based upon previously measured data, such as performance data, for the resource or resources subject to the SLA. Notably, in a base mode of operation, the data can reflect "best practices" and can be derived from measured data globally without respect to a particular customer. In an advanced aspect of the invention, the data can relate to a specific customer, and in a further advanced aspect of the invention, the data can relate to a specific sub-set of resources associated with a specific customer.

Finally, in yet a further advanced aspect of the invention, the data can be predictive in nature and the SLA breach value estimate can be produced by extrapolating existing data to predict future data. Importantly, tolerances can be modified to morph a computed SLA breach value estimate based upon historically measured data into a revised SLA breach value estimate. Additionally, a graphical user interface can be presented in which a chart of the data over time can be rendered. A visual representation of the SLA breach value estimate can be rendered within the chart and can be visually manipulated to modify the SLA breach value setting in an SLA.

Figure 1:
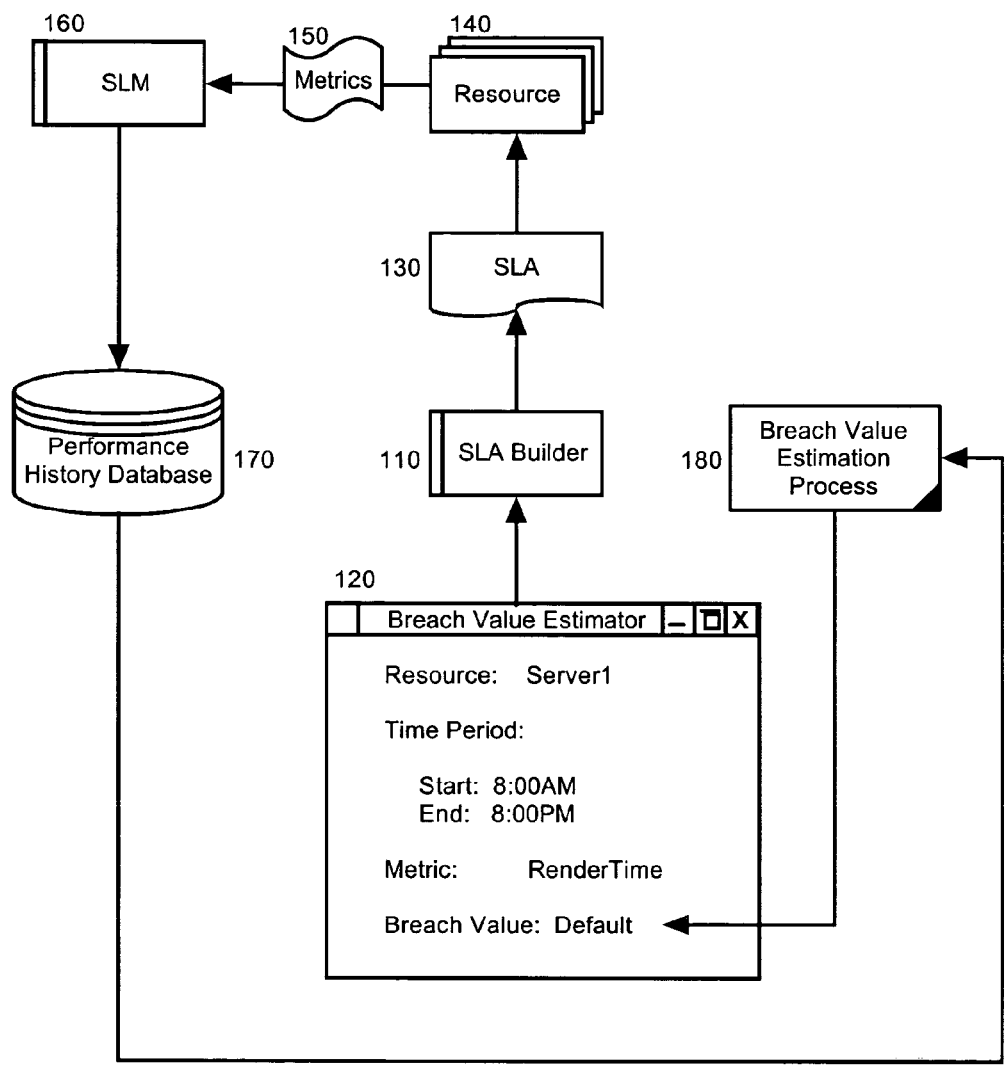
FIG. 1 is a pictorial illustration of a system and process for SLA breach value estimation.

In further illustration of the present invention, FIG. 1 is a pictorial illustration of a system and process for SLA breach value estimation. The system of the present invention can include an SLA builder 110 configured to generate an SLA 130 based upon the performance of one or more resources 140. A service level monitor 160 can be coupled to the resources 140 as well and can monitor the performance of the resources 140, particularly in respect to the SLA 130. Specifically, during the course of performance, data 150 for the performance of the resources can be measured by the service level monitor 160. The data 150 subsequently can be written to a performance history database 170.

Significantly, a breach value estimation process 180 can be communicatively coupled to the performance history database 170. The breach value estimation process 180 can process the data 150 stored in the performance history database 170 to produce an SLA breach value estimate. The SLA breach value estimate, in turn, can be proposed to the end user through a user interface 120 to the SLA builder 110. Though the end user need not consider the SLA breach value estimate in establishing an SLA breach value, the SLA breach value estimate can proactively suggest the SLA breach value estimate in an attempt to assist the user in selecting a suitable SLA breach value.

Figure 2:
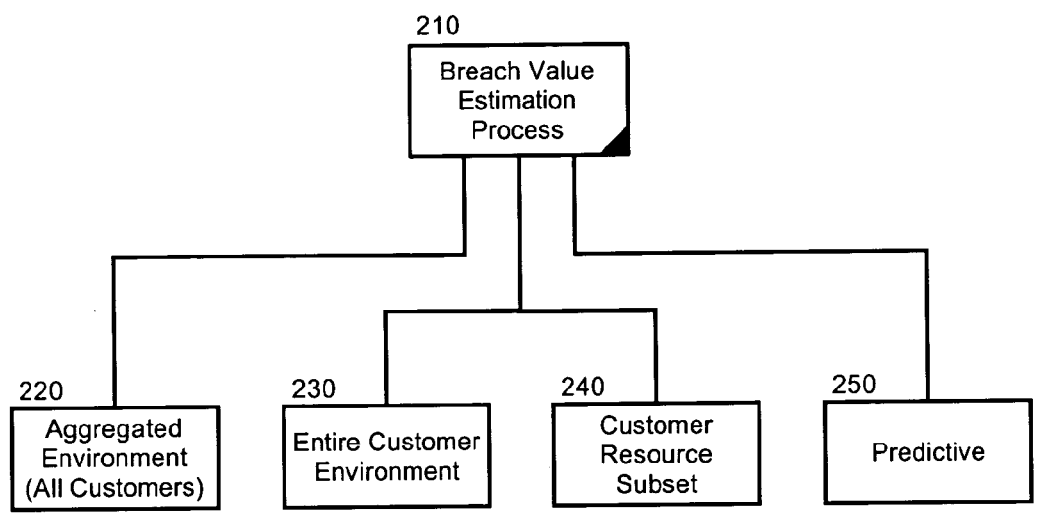
FIG. 2 is a block diagram illustrating four exemplary configurations for the SLA breach value estimation process of FIG. 1; and, FIG. 3 is an exemplary screen shot of a graphical user interface for the SLA breach value estimation process of FIG. 1.

Importantly, the SLA breach value estimation process 180 can produce an SLA breach value estimate according to one or more acceptable estimation methods. In this regard, FIG. 2 is a block diagram illustrating four exemplary configurations for the SLA breach value estimation process of FIG. 1. As shown in FIG. 2, the SLA breach value estimation process 210 can include an aggregated process 220 based upon data collected from all customers. Consequently, the SLA breach value estimate produced by the aggregated process 220 can be viewed as a "best practices" approach in as much as the SLA breach value estimate will not account for individual customer system environments, specific resources or time periods.

As an example, a basic best practices estimate can provide for a specific response time for providing a Web page (e.g. average Web page render time=500 ms) without regard for the time frame in which the specific response time had been measured, and the particular system environments associated with the data. Notably, while one time frame may suit one customer, the same time frame may not suit another customer. Accordingly, in a preferred aspect of the present invention, the SLA breach value estimation process can incorporate a more advanced algorithm which accounts for specific customers and, where required, a specific subset of resources.

Returning now to FIG. 2, an SLA breach value estimate can be produced based upon specific customers data 230 measured for a specific customer, and optionally, a specific resource type. The approach of the specific customer data 230 can produce an SLA breach value estimate which is specific to the customer environment and representative of all of the resources of a certain type in that environment. As an example, the specific customer data 230 algorithm can account for the average Web page render time across all Web servers in a specific customer environment over a six month period.

In the customer resource subset algorithm 240, the approach of the specific customer data algorithm 230 can be applied with the exception that the data of only a subset of the resources in the customer environment are considered. By limiting the resources considered to a subset, a more accurate SLA breach value estimate can be computed for an SLA which specifies a resource within the subset. As an example, an SLA breach value estimate can be computed based upon the average Web page render time across those Web servers having a root domain of "raleigh.ibm.com" as measured across a six month period. A proportionate value such as 125% of the computation can be selected as the default SLA breach value.

Finally, in a more complicated approach to the SLA breach value estimation process 210, a predictive algorithm 250 can be applied. In the predictive algorithm, both actual and predicted data are incorporated into the estimate. In particular, historical trends can be considered in predicting the data of the resource or resources going forward. Several predictive models are known in the art which can include linear regression, though graphical extrapolation also remains a valid method for generating a predictive value.

Importantly, in addition to permitting the direct establishment of an SLA breach value based upon a predictive estimate, a compliance percentage can be specified in lieu of a specific value responsive to which a precise SLA breach value can be suggested by the SLA breach value estimation process 210. For instance, where a 97% compliance rate has been requested, for a given time range, the breach value can be automatically computed using historical systems management data to yield 3% or fewer breaches of the SLA. In this way, the establishment of the SLA breach value can more closely reflect to the business concerns in setting an SLA breach value.

Figure 3:
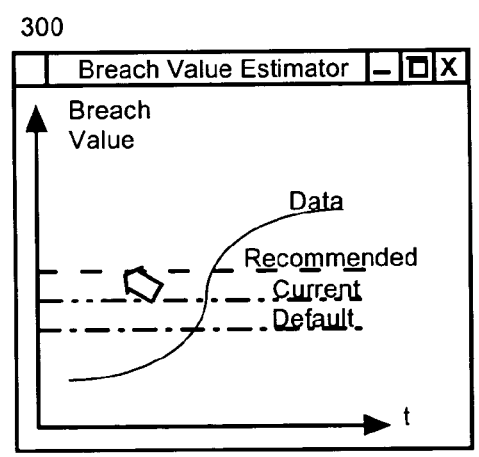

Notably, in regard to the entire customer environment 230 and the customer resource subset 240 algorithms, a graphical user interface can be rendered for the benefit of an administrator in establishing an SLA breach value. As shown in FIG. 3, A graph 300 can be generated which includes data for a set of resources over a given time range. In the graph, a line can be drawn for a recommended breach value as dynamically calculated based upon historical data. The graph 300 further can reflect a current breach value and a default breach value. The graph 300 can be interactive so that an administrator can adjust the recommended breach value by graphically manipulating the placement of the line along the y-axis of the graph 300 in order to potentially yield few or no SLA breaches in the future.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer hardware system configured to generate a service level agreement (SLA) associated with a resource, comprising:
   at least one processor, wherein the at least one processor is configured to perform or initiate:
   calculating an estimated SLA breach value using historical performance data for the resource,
   generating a chart including the historical data for the resource and the estimated SLA breach value setting to enable visual manipulation of the breach value setting,
   providing, to a user, the chart including the estimated SLA breach value,
   retrieving, from the user, a selected SLA breach value that is based on the estimated SLA breach value and the chart provided to the user, and
   generating the SLA agreement using the selected SLA breach value.

2. The system of claim 1, wherein the historical performance data is associated with only a specific user.

3. The system of claim 1, wherein the resource is from a selected subset of sources.

4. The system of claim 1, wherein
   the at least one processor is further configured to perform or initiate:
   receiving a compliance percentage, and
   the calculating the estimated SLA breach value includes using the compliance percentage.

5. The system of claim 1, wherein the calculating the estimate SLA breach values includes using predicted data.

6. The system of claim 1, wherein the at least one processor is further configured to perform or initiate:
   regenerating the chart to include the selected SLA breach value.

7. A computer program product, comprising:
   a computer readable storage medium having stored therein computer readable program code for generating a service level agreement (SLA) associated with a resource, the computer readable program code, which when executed by a computer hardware system, causes the computer hardware system to perform:
   calculating an estimated SLA breach value using historical performance data for the resource,
   generating a chart including the historical performance data for the resource and the estimated SLA breach value setting to enable visual manipulation of the breach value setting, providing, to a user, the chart including the estimated SLA breach value, retrieving, from the user, a selected SLA breach value that is based on the estimated SLA breach value and the chart provided to the user, and generating the SLA agreement using the selected SLA breach value, wherein the computer readable storage medium is not a transitory, propagating signal per se.

8. The computer program product of claim 7, wherein the historical performance data is associated with only a specific user.

9. The computer program product of claim 7, wherein the resource is from a selected subset of sources.

10. The computer program product of claim 7, wherein the computer readable program code further causes the computer hardware system to perform:

receiving a compliance percentage, and the calculating the estimated SLA breach value includes using the compliance percentage.

11. The computer program product of claim 7, wherein the calculating the estimate SLA breach values includes using predicted data.

* * * * *